(12) United States Patent
Cheng et al.

(10) Patent No.: US 6,947,279 B2
(45) Date of Patent: Sep. 20, 2005

(54) PORTABLE ELECTRONIC APPARATUS HAVING HOST AND DISPLAY MODULES INTERCONNECTED BY A FOLDING PIVOT MODULE

(75) Inventors: Chih-Chuan Cheng, Taipei (TW); Wei-Pin Chuang, Taipei (TW)

(73) Assignee: Compal Electronics Inc., Taipei (TW)

( * ) Notice: Subject to any disclaimer, the term of this patent is extended or adjusted under 35 U.S.C. 154(b) by 181 days.

(21) Appl. No.: 10/453,629

(22) Filed: Jun. 4, 2003

(65) Prior Publication Data

US 2004/0246665 A1 Dec. 9, 2004

(51) Int. Cl.[7] .............................................. G06F 1/16
(52) U.S. Cl. ........................ 361/683; 248/917; 349/58
(58) Field of Search ............................... 361/679–686; 248/917–921; 349/58–60

(56) References Cited

U.S. PATENT DOCUMENTS

| | | | | |
|---|---|---|---|---|
| 5,668,570 A | * | 9/1997 | Ditzik | ........................ 345/173 |
| 6,430,038 B1 | * | 8/2002 | Helot et al. | .................. 361/681 |
| 6,437,973 B1 | * | 8/2002 | Helot et al. | .................. 361/681 |
| 6,654,230 B1 | * | 11/2003 | Jones et al. | .................. 361/680 |
| 2002/0145847 A1 | * | 10/2002 | Crosby | ........................ 361/683 |
| 2004/0114315 A1 | * | 6/2004 | Anlauff | ...................... 361/681 |

* cited by examiner

*Primary Examiner*—Lisa Lea-Edmonds
(74) *Attorney, Agent, or Firm*—Bacon & Thomas, PLLC

(57) ABSTRACT

A portable electronic apparatus includes a host module, a display module, and a folding pivot module interconnecting the host and display modules. The pivot module includes first and second module members. The host module is connected pivotally to the first module member. The first module member is formed with a receiving cavity and is connected pivotally to the second module member. The display module is connected pivotally to the second module member. The second module member is received in the receiving cavity when in a folded position.

13 Claims, 5 Drawing Sheets

PORTABLE ELECTRONIC APPARATUS HAVING HOST AND DISPLAY MODULES INTERCONNECTED BY A FOLDING PIVOT MODULE

BACKGROUND OF THE INVENTION

1. Field of the Invention

The invention relates to a portable electronic apparatus, more particularly to a portable electronic apparatus having host and display modules interconnected by a folding pivot module.

2. Description of the Related Art

A conventional portable personal computer includes a host module and a display module. A pivot joint interconnects a first pivot portion of the host module and a second pivot portion of the display module, and permits relative rotation between the host and display modules about a common pivot axis. As such, the display module can be rotated about the common pivot axis to form different angles between the host and display modules and can be retained at different angular positions.

Although the pivot joint achieves its intended purpose, the display module is positioned at a relatively low height. As such, the user has to lower his head when using the conventional portable personal computer. For long time use, the posture of the user when using the conventional portable personal computer is both ineffective and unhealthy. Moreover, when using the conventional portable personal computer to make a presentation before an audience, since the display module is relatively small, the audience and the presenter must be crowded in a rather small area to view the screen of the display module of the conventional portable personal computer. This is impractical and inconvenient when making presentations.

SUMMARY OF THE INVENTION

Therefore, the main object of the present invention is to provide a portable electronic apparatus that has a folding pivot module so as to overcome the aforesaid drawbacks of the prior art.

Another object of the invention is to provide a folding pivot module that can be used to interconnect host and display modules of a portable electronic apparatus without the need to make substantial modifications in the circuit designs of the host and display modules.

According to one aspect of the present invention, a portable electronic apparatus comprises a host module, a display module that is connected electrically to the host module, and a folding pivot module that interconnects the host and display modules. The pivot module includes a first module member that has a first pivot end portion, a second pivot end portion opposite to the first pivot end portion, and lateral end portions that interconnect the first and second pivot end portions. The host module is connected pivotally to the first pivot end portion of the first module member. The first module member is formed with a receiving cavity that extends from the second pivot end portion toward the first pivot end portion and that is disposed between the lateral end portions. The pivot module further includes a second module member having a third pivot end portion and a fourth pivot end portion opposite to the third pivot end portion. The second pivot end portion of the first module member is connected pivotally to the third pivot end portion of the second module member. The display module is connected pivotally to the fourth pivot end portion of the second module member. The second module member is pivotable relative to the first module member from an unfolded position to a folded position, where the second module member is received in the receiving cavity.

According to another aspect of the present invention, a folding pivot module is adapted to interconnect first and second members. The folding pivot module comprises a first module member that has a first pivot end portion, a second pivot end portion opposite to the first pivot end portion, and lateral end portions that interconnect the first and second pivot end portions. The first pivot end portion of the first module member is adapted to be connected pivotally to the first member. The first module member is formed with a receiving cavity that extends from the second pivot end portion toward the first pivot end portion and that is disposed between the lateral end portions. The pivot module further comprises a second module member having a third pivot end portion and a fourth pivot end portion opposite to the third pivot end portion. The second pivot end portion of the first module member is connected pivotally to the third pivot end portion of the second module member. The fourth pivot end portion of the second module member is adapted to be connected pivotally to the second member. The second module member is pivotable relative to the first module member from an unfolded position to a folded position, where the second module member is received in the receiving cavity.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
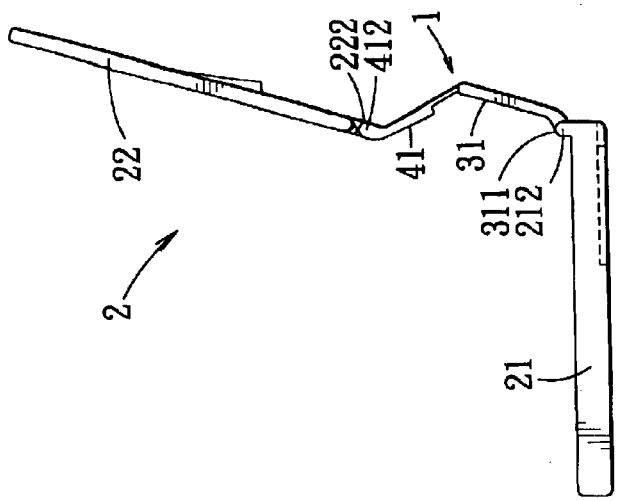
FIG. 2 is a schematic side view of the preferred embodiment, illustrating a second module member in an unfolded position.
Figure 1:
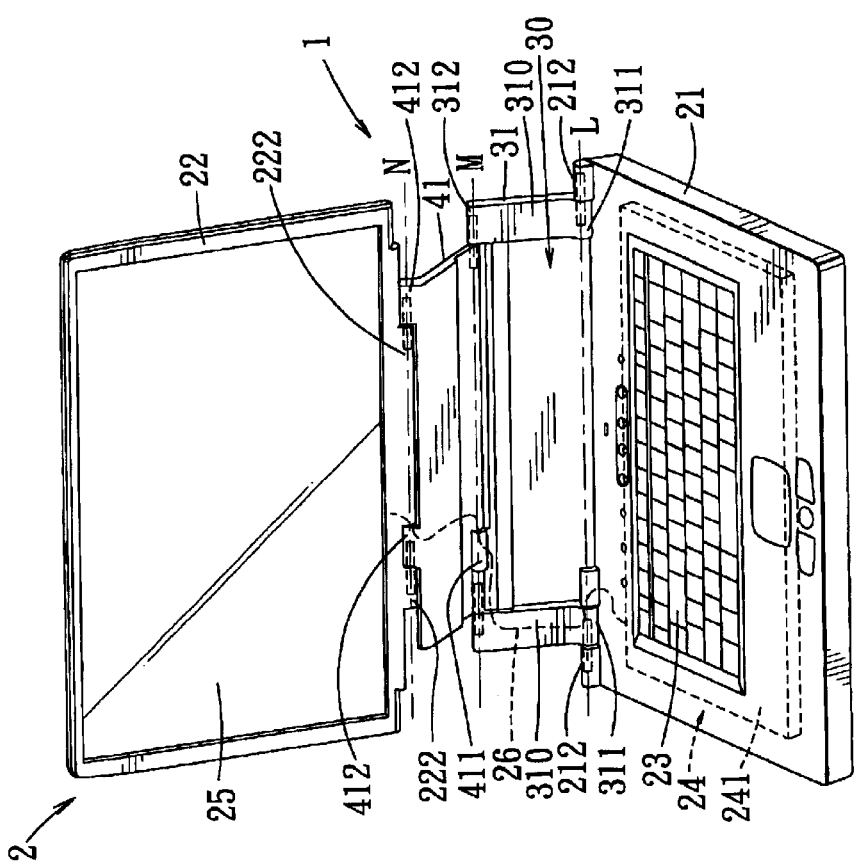
FIG. 1 is a perspective view of the preferred embodiment of a portable electronic apparatus according to the present invention.

Referring to FIGS. 1 and 2, the preferred embodiment of a portable electronic apparatus 2 according to this invention is shown to include a host module 21, a display module 22, and a folding pivot module 1.

The portable electronic apparatus 2 of this embodiment is embodied in a portable personal computer. The host module 21 has a first pivot portion 212, and includes a host circuit 24 and an input device 23 coupled electrically to the host circuit 24, in a conventional manner. In this embodiment, the host circuit 24 includes a motherboard 241 and a central processing unit (not shown) mounted on the motherboard 241. The input device 23 is embodied in a mechanical keyboard. In another embodiment, the input device 23 is embodied using a touchpad.

The display module 22 has a front side, a rear side and a second pivot portion 222, and includes a display unit 25 that is mounted on the front side of the display module 22 and that is coupled electrically to the host circuit 24 of the host module 21. In this embodiment, the display unit 25 is embodied in a liquid crystal display.

The folding pivot module 1 interconnects the host and display modules 21, 22, and includes first and second module members 31, 41. The first module member 31 has a first pivot end portion 311, a second pivot end portion 312 opposite to the first pivot end portion 311, and lateral end portions 310 that interconnect the first and second pivot end portions 311, 312. The second module member 4 has a third pivot end portion 411 and a fourth pivot end portion 412 opposite to the third pivot end portion 411. In this embodiment, the first module member 31 is formed with a receiving cavity 30 that extends from the second pivot end portion 312 toward the first pivot end portion 311 and that is disposed between the lateral end portions 310.

Preferably, the first pivot portion 212 of the host module 21 is connected to the first pivot end portion 311 of the first module member 31 such that the first module member 31 is pivotable relative to the host module 21 about a first axis (L). The second pivot end portion 312 of the first module member 31 is connected to the third pivot end portion 411 of the second module member 41 such that the second module member 41 is pivotable relative to the first module member 31 about a second axis (M). The second pivot portion 222 of the display module 22 is connected to the fourth pivot end portion 412 of the second module member 41 such that the display module 22 is pivotable relative to the second module member 41 about a third axis (N). In this embodiment, the first, second and third axes (L, M, N) are parallel to each other.

In addition, a flexible conductive unit 26 is used to connect electrically the display unit 25 of the display module 22 and the host circuit 24 of the host module 21. In particular, the conductive unit 26 has opposite end portions that are connected electrically and respectively to the host circuit 24 and the display unit 25, and an intermediate portion that is disposed between the opposite end portions of the conductive unit 26 and that extends through the pivot module 1.

Figure 4:
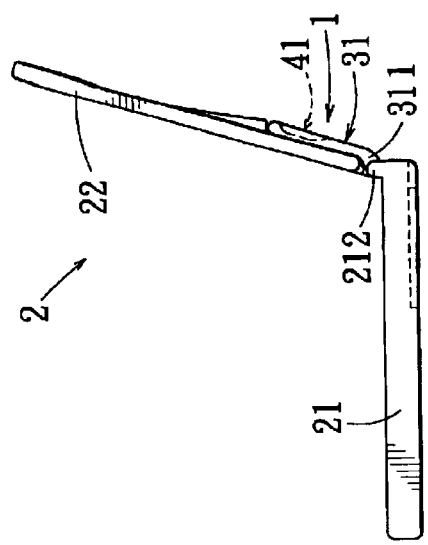
FIG. 4 is a schematic side view of the preferred embodiment, illustrating the second module member in the folded position.
Figure 3:
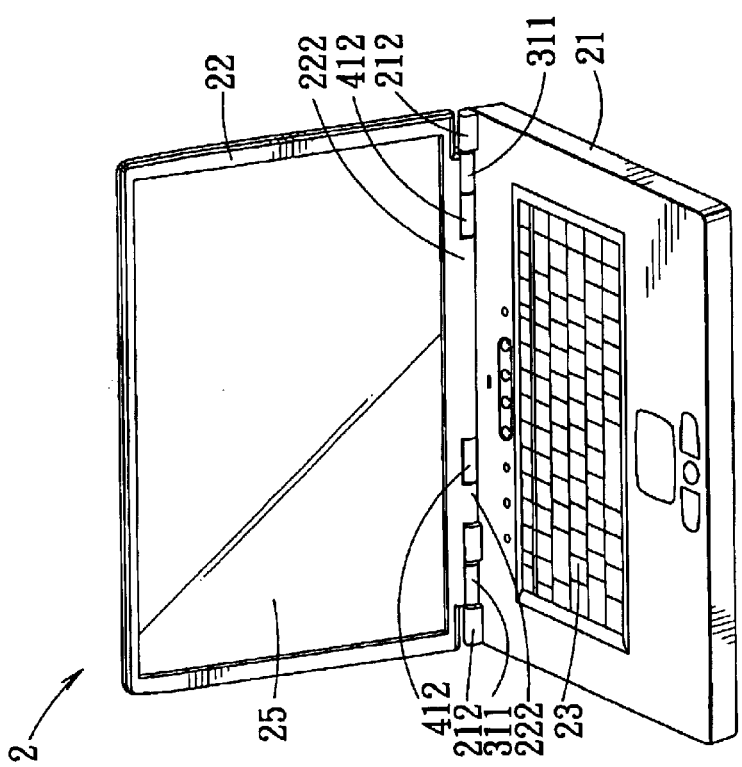
FIG. 3 is a perspective view of the preferred embodiment, illustrating the second module member in a folded position.

With further reference to FIGS. 3 and 4, the second module member 41 is pivotable relative to the first module member 31 about the second axis (M) from an unfolded position to a folded position.

When the second module member 41 is in the unfolded position, as best shown in FIGS. 1 and 2, the first module member 31 of the pivot module 1 can be rotated about the pivot axis (L) to form different angles between the host module 21 and the first module member 31 and can be retained at different angular positions. Moreover, the display module 22 can be rotated about the pivot axis (N) to form different angles between the display module 22 and the second module member 41 of the pivot module 1 and can be retained at different angular positions. Further, the first and second module members 31, 41 can be rotated about the pivot axis (M) to form different angles therebetween and can be retained at different angular positions. At this time, relative horizontal, vertical and angular distances of the display module 22 with respect to the host module 21 can be conveniently adjusted. As such, the display module 22 can be conveniently positioned relative to the host module 21 so as to suit comfort, purpose or needs of the user.

When the second module member 41 is in the folded position, as best shown in FIGS. 3 and 4, the second module member 41 is received in the receiving cavity 30, the third axis (N) coincides with the first axis (L) to form a common pivot axis, and the first module member 31 can be rotated to dispose the pivot module 1 on the rear side of the display module 22. At this time, the display module 22 can be rotated about the common pivot axis to form different angles between the host and display modules 21, 22 and can be retained at different angular positions. -As such, the portable electronic apparatus 2 of the present invention can be used in a same manner as the conventional portable electronic apparatus.

Figure 5:
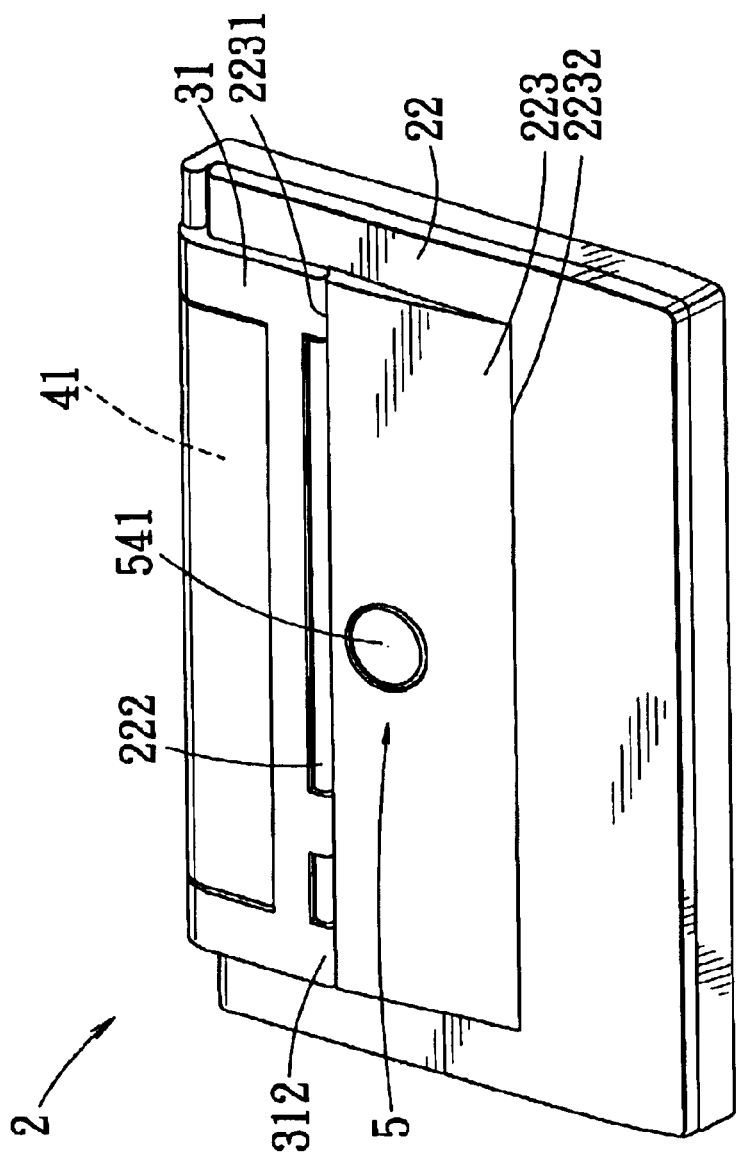
FIG. 5 is a perspective view of the preferred embodiment, illustrating a locking unit.
Figure 6:
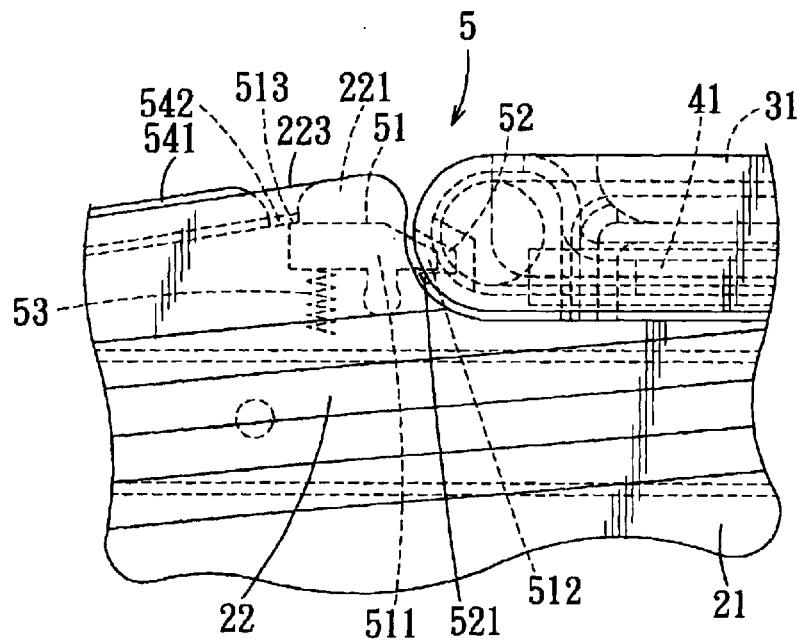
FIG. 6 is fragmentary schematic view to illustrate a release button in a non-pressing position and an outer portion of a latch member extending into a locking hole.
Figure 7:
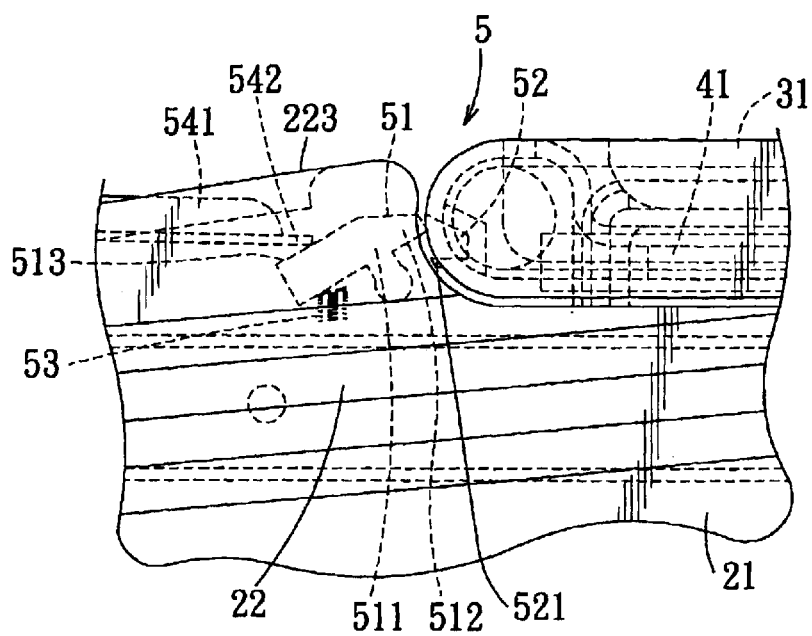
FIG. 7 is fragmentary schematic view to illustrate the release button in a pressing position and the outer portion of the latch member moved out of the locking hole.

Referring to FIGS. 5 to 7, the portable electronic apparatus 2 further comprises a locking unit 5 for locking releasably the pivot module 1 to the rear side of the display module 22 when the second module member 41 is in the folded position.

As best shown in FIG. 5, the rear side of the display module 22 is formed with a rectangular projection 223. The projection 223 has first and second ends 2231, 2232 that are respectively proximate to and distal from the second pivot portion 222 of the display module 22, and a thickness that gradually increases from the second end 2232 to the first end 2231 such that the thickness at the first end 2231 of the projection 223 is substantially the same as that of the second pivot end portion 312 of the first module member 31.

As best shown in FIG. 6, the first end 2231 of the projection 223 of the rear side of the display module 22 is formed with a groove 221 that is confined by a groove-defining wall. The locking unit 5 includes a locking hole 52 that is formed in the third pivot end portion 411 of the second module member 41 and that is confined by a hole-defining wall. The hole-defining wall has a periphery 521. A spring-loaded latch unit is disposed on the rear side of the display module 22 to engage releasably the locking hole 52. In particular, the spring-loaded latch unit includes a latch member 51. The latch member 51 has an inner portion. 513 that extends into the groove 221, an outer portion 512 that is disposed externally of the groove 221, and a middle portion 511 that is connected pivotally to the groove-defining wall, thereby retaining the inner portion 513 in the groove 221 such that the outer portion 512 is movable toward and away from the display module 22. As such, when the second module member 41 is in the folded position and the first module member 31 is rotated to dispose the pivot module 1 on the rear side of the display module 22, the periphery 521 of the hole-defining wall abuts against the outer portion 512 of the latch member 51 until the locking hole 52 is aligned with the latch member 51. At this time, the outer portion. 512 of the latch member 51 extends into the locking hole 52 to retain releasably the pivot module 1 on the rear side of the display module 22, as best shown in FIG. 6.

The latch unit further includes a release button 541 mounted on the rear side of the display module 22. The release button 541 has a periphery 542 that abuts against the inner portion 513 of the latch member 51. As best shown in FIG. 7, the release button 541 is operable so as to move from a non-pressing position to a pressing position, where the periphery 521 of the release button 541 presses against the inner portion 513 of the latch member 51. This causes the outer portion 512 of the latch member 51 to move out of the locking hole 52. Accordingly, pivoting movement of the first module member 31 away from the rear side of the display module 22 and subsequent movement of the second module member 41 to the unfolded position are permitted. A biasing spring 53 is used for biasing the release button 541 to the non-pressing position. In particular, the biasing spring 53 has opposite ends that abut against the inner portion 513 of the latch member 51 and the groove-defining wall, respectively.

Figure 9:
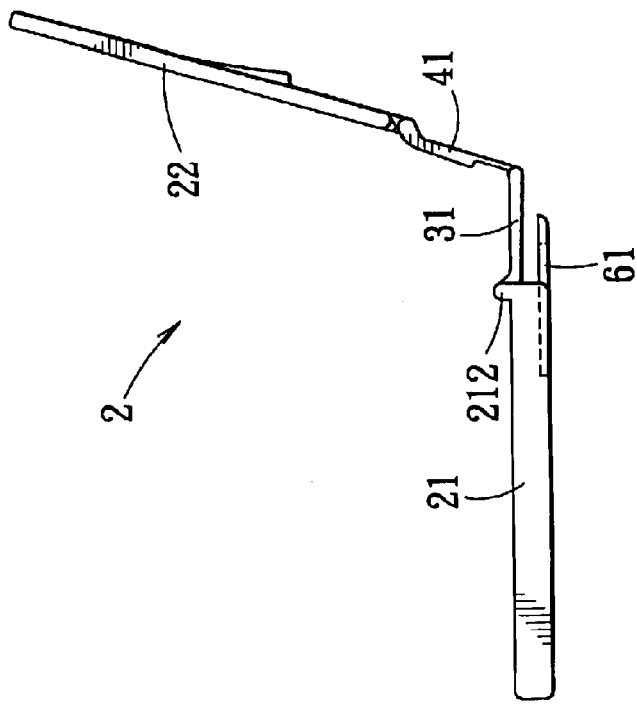
FIG. 9 is a schematic side view to illustrate the support leg unit in an extended position.
Figure 8:
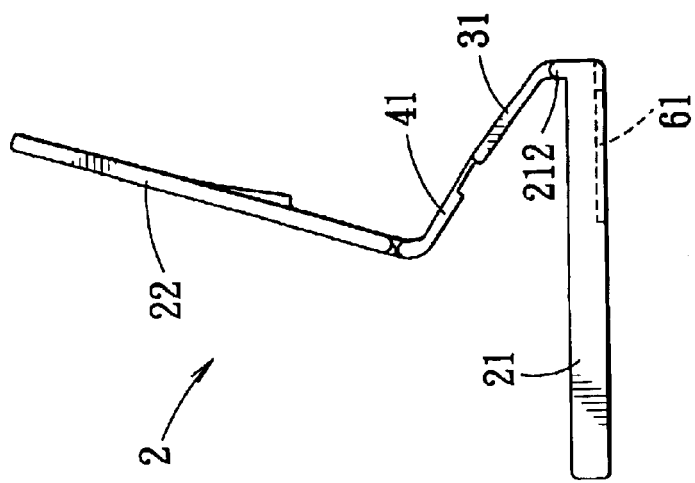
FIG. 8 is a schematic side view to illustrate a support leg unit of the preferred embodiment in a is retracted position.

Referring to FIGS. 8 and 9, the portable electronic apparatus 2 further includes a support leg unit 61 that is disposed underneath the host module 21 for supporting the portable electronic apparatus 2 when the second module member 41 is in the unfolded position. The support leg unit 61 is disposed under the first pivot portion 212 of the host module 21 and is operable so as to move from a retracted position, where the support leg unit 61 is retracted into the host module 21, as best shown in FIG. 8, to an extended position, where the support leg unit 61 extends out of the host module 21, as best shown in FIG. 9, to result in enhanced stability due to a larger contact area with a table surface (not shown) From the above description, the pivot module 1 is designed so as not to affect the internal circuit configurations of the host and display modules 21, 22. The modular design of the pivot module 1 permits the pivot module 1 to be assembled directly on the host and display modules 21, 22, thereby enhancing flexibility and reducing manufacturing cost.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A portable electronic apparatus comprising:
   a host module;
   a display module connected electrically to said host module, and having a rear side that is formed with a groove confined by a groove-defining wall;
   a folding pivot module interconnecting said host and display modules and including
      a first module member having a first pivot end portion that is connected pivotally to said host module, a second pivot end portion opposite to said first pivot end portion, and lateral end portions that interconnect said first and second pivot end portions, said first module member being formed with a receiving cavity that extends from said second pivot end portion toward said first pivot end portion and that is disposed between said lateral end portions, and
      a second module member having a third pivot end portion that is connected pivotally to said second pivot end portion of said first module member, and a fourth pivot end portion that is opposite to said third pivot end portion and that is connected pivotally to said display module, said second module member being pivotable relative to said first module member from an unfolded position to a folded position, where said second module member is received in said receiving cavity; and
   a locking unit for locking releasably said pivot module to said rear side of said display module when said second module member is in the folded position, said locking unit including
      a locking hole formed in one of said second pivot end portion of said first module member and said third pivot end portion of said second module member and confined by a hole-defining wall that has a periphery, and
      a spring-loaded latch unit for engaging releasably said locking hole, said spring-loaded latch unit including a latch member having an inner portion that extends into said groove and that is connected movably to said groove-defining wall, and an outer portion that is disposed externally of said groove,
   wherein, when said second module member is in the folded position, and said first module member is rotated to dispose said pivot module on said rear side of said display module, said periphery of said hole-defining wall abuts against said outer portion of said latch member until said locking hole is aligned with said latch member, during which time said outer portion of said latch member extends into said locking hole to retain releasably said pivot module on said rear side of said display module.

2. The portable electronic apparatus as claimed in claim 1, wherein said first module member is pivotable relative to said host module about a first axis, said second module member is pivotable relative to said first module member about a second axis, and said display module is pivotable relative to said second module member about a third axis.

3. The portable electronic apparatus as claimed in claim 2, wherein the fist, second and third axes are parallel to each other, and the third axis coincides with the first axis when said second module member is in the folded position.

4. The portable electronic apparatus as claimed in claim 1, wherein said inner portion of said latch member is pivotally retained in said groove such that said outer portion of said latch member is movable toward and away from said display module, said latch unit further including:
   a release button mounted on said rear side of said display module and operable so as to move from a non-pressing position to a pressing position, where said release button presses against said inner portion of said latch member to cause said outer portion of said latch member to move out of said locking hole, thereby permitting pivoting movement of said first module member away from said rear side of said display module and subsequent movement of said second module member to the unfolded position; and
   a biasing spring acting on said inner portion of said latch member to dispose said release button at the non-pressing position.

5. The portable electronic apparatus as claimed in claim 1, further including a support leg unit that is disposed underneath said host module for supporting said portable electronic apparatus when said second module member is in the unfolded position.

6. The portable electronic apparatus as claimed in claim 5, wherein said support leg unit is mounted retractably on one end of said host module that is pivoted to said pivot module.

7. The portable electronic apparatus as claimed in claim 1, wherein said host module includes a host circuit and an input device coupled electrically to said host circuit, said display module including a display unit that is coupled electrically to said host circuit.

8. A portable electronic apparatus comprising:

a host module;

a display module connected electrically to said host module, and having a rear side that is formed with a groove confined by a groove-defining wall;

a folding pivot module interconnecting said host and display modules and permitting relative rotation between said host and display modules about first, second and third axes that are parallel to each other, said pivot module including a first module member having a first pivot end portion that is connected to said host module such that said first module member is pivotable relative to said host module about the first axis, a second pivot end portion opposite to said first pivot end portion, and lateral end portions that interconnect said first and second pivot end portions, said first module member being formed with a receiving cavity that extends from said second pivot end portion toward said first pivot end portion and that is disposed between said lateral end portions, and a second module member having a third pivot end portion that is connected to said second pivot end portion of said first module member such that said second module member is pivotable relative to said first module member about the second axis from an unfolded position to a folded position, where said second module member is received in said receiving cavity, and a fourth pivot end portion that is opposite to said third pivot end portion, and that is connected to said display module such that said display module is pivotable relative to said second module member about the third axis; and a locking unit for locking releasably said pivot module to said rear side of said display module when said second module member is in the folded position, said locking unit including a locking hole formed in one of said second pivot end portion of said first module member and said third pivot end portion of said second module member, and confined by a hole-defining that has a periphery, and a spring-loaded latch unit for engaging releasably said locking hole, and including a latch member having an inner portion that extends into said groove and that is connected movably to said groove-defining wall, and an outer portion that is disposed externally of said groove, wherein, when said second module member is in the folded position, and said first module member is rotated to dispose said pivot module on said rear side of said display module, said periphery of said hole-defining wall abuts against said outer portion of said latch member until said locking hole is aligned with said latch member, during which time said outer portion of said latch member extends into said locking hole to retain releasably said pivot module on said rear side of said display module.

9. The portable electronic apparatus as claimed in claim 8, wherein the third axis coincides with the first axis when said second module member is in the folded position.

10. The portable electronic apparatus as claimed in claim 8, wherein said inner portion of said latch member is pivotally retained in said groove such that said outer portion of said latch member is movable toward and away from said display module, said latch unit further including:

a release button mounted on said rear side of said display module and operable so as to move from a non-pressing position to a pressing position, where said release button presses against said inner portion of said latch member to cause said outer portion of said latch member to move out of said locking hole, thereby permitting pivoting movement of said first module member away from said rear side of said display module and subsequent movement of said second module member to the unfolded position; and a biasing spring acting on said inner portion of said latch member to disposed said release button at the non-pressing position.

11. The portable electronic apparatus as claimed in claim 8, further including a support leg unit that is disposed underneath said host module for supporting said portable electronic apparatus when said second module member is in the unfolded position.

12. The portable electronic apparatus as claimed in claim 11, wherein said support leg unit is mounted retractably on one end of said host module that is pivoted to said pivot module.

13. The portable electronic apparatus as claimed in claim 3, wherein said host module includes a host circuit and an input device coupled electrically to said host circuit, said display module including a display unit that is coupled electrically to said host circuit.

* * * * *